(12) United States Patent
Kissel, Jr.

(10) Patent No.: US 8,493,024 B2
(45) Date of Patent: Jul. 23, 2013

(54) APPARATUS FOR PULSE CHARGING ELECTRIC VEHICLES

(75) Inventor: Waldemar F. Kissel, Jr., Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 301 days.

(21) Appl. No.: 12/776,911

(22) Filed: May 10, 2010

(65) Prior Publication Data

US 2010/0320965 A1 Dec. 23, 2010

Related U.S. Application Data

(63) Continuation-in-part of application No. 12/548,837, filed on Aug. 27, 2009, now Pat. No. 8,179,091, and a continuation-in-part of application No. 12/134,722, filed on Jun. 6, 2008, now Pat. No. 7,906,935.

(60) Provisional application No. 60/942,389, filed on Jun. 6, 2007.

(51) Int. Cl.
*H02J 7/00* (2006.01)

(52) U.S. Cl.
USPC .......................................................... 320/109

(58) Field of Classification Search
USPC ........................................................ 320/109
See application file for complete search history.

(56) References Cited

U.S. PATENT DOCUMENTS

| | | | |
|---|---|---|---|
| 3,589,300 A * | 6/1971 | Wipf | 104/281 |
| 3,637,956 A | 1/1972 | Blackman | |
| 3,914,562 A | 10/1975 | Bolger | |
| 4,139,071 A | 2/1979 | Tackett | |
| 5,148,883 A * | 9/1992 | Tanaka et al. | 180/165 |
| 5,323,098 A | 6/1994 | Hamaguchi et al. | |
| 5,359,308 A | 10/1994 | Sun et al. | |
| 5,559,420 A | 9/1996 | Kohchi | |
| 5,573,090 A * | 11/1996 | Ross | 191/10 |
| 5,669,470 A | 9/1997 | Ross | |
| 5,821,728 A | 10/1998 | Schwind | |
| 6,265,851 B1 | 7/2001 | Brien et al. | |
| 2009/0009131 A1 | 1/2009 | Kissel, Jr. | |

* cited by examiner

*Primary Examiner* — Arun Williams
(74) *Attorney, Agent, or Firm* — GrayRobinson, P.A.; Michael J. Colitz, III (57) ABSTRACT

Disclosed is a method and apparatus for charging electrically powered devices. In accordance with the invention, the device is powered by two storage devices. One storage device is capable of receiving a substantial charge very rapidly while the other storage device requires a longer time to receive a charge. The advantage is that the powered device can be used almost instantly and continually while at the same time rebuilding electrical charge.

6 Claims, 8 Drawing Sheets

FIG.8

APPARATUS FOR PULSE CHARGING ELECTRIC VEHICLES

CROSS REFERENCE TO RELATED APPLICATIONS

This application claims priority to and is a continuation in part of application Ser. No. 12/548,837 filed on Aug. 27, 2009, now Pat. No. 8,179,091, issued May 15, 2012, and entitled "Method and Apparatus for Protecting Charging Devices from Surges and Lightning Strikes." This application also claims priority to and is a continuation in part of application Ser. No. 12/134,722 filed on Jun. 6, 2008, now Pat. No. 7,906,935, issued Mar. 15, 2011, and entitled "Method and Apparatus for Charging Electric Devices," which in turn claims priority to provisional application Ser. No. 60/942,389 filed on Jun. 6,2007 and entitled "Method and Apparatus for Charging Electric devices". The contents of all these applications are fully incorporated herein by reference.

BACKGROUND OF THE INVENTION

1. Field of the Invention

This invention relates to a method and apparatus for charging electric devices. More particularly, the present invention relates to a system for rapidly charging an electric vehicle via a pulse charge.

2. Description of the Background Art

The use of electrically powered vehicles is known in the art. For example, U.S. Pat. No. 3,637,956 to Blackman discloses an electrical automobile transportation system. The system embodies exposed electrified conductors on the road and electrical current collectors on the vehicle for contacting the road conductors. The electrified conductors supply electrical energy to the vehicle for power.

Another example is U.S. Pat. No. 3,914,562 to Bolger. Bolger discloses an electrically driven vehicle that has suitable batteries to drive the vehicle on conventional roads. The vehicle also has means for receiving power from a conductor embedded in a prepared roadway for driving the vehicle and for charging the batteries.

Another electric vehicle is disclosed in U.S. Pat. No. 4,139,071 to Tackett. Tackett discloses a roadway having a smooth road surface for vehicles and means for transmitting electric current through the road surface to electrically operated vehicles traveling thereon.

Although each of the referenced inventions achieves its own unique objective, all suffer from common drawbacks. Namely, the referenced systems require substantial time in order to fully charge the vehicle. Yet another problem associated with these electric powered vehicles is the cost of providing a continuous set of electrified rails along every foot of the roadway. Continuous electrified rails consume large amounts of energy and are inefficient. There is a need in the forgoing systems for a means of rapidly and efficiently charging an electric vehicle to thereby eliminate the need for stopping the vehicle for purposes of receiving power. There is also a need to provide such power via discrete power supplies along the length of the roadway. The present invention is aimed at overcoming these deficiencies.

SUMMARY OF THE INVENTION

It is therefore one of the objects of this invention to provide an electrically powered vehicle that is powered from discrete and discontinuous electrical contacts embedded at spaced distances along a roadway.

It is an additional object of this continuation to use intermittent charging stations, in lieu of continuous charged electric rails.

It is another object of this invention to rapidly charge an electric vehicle via a pulse charge.

It is another object of this invention to provide an electrically powered vehicle that is equipped with a bank of high capacity high voltage capacitors to enable the vehicle's batteries to be quickly and efficiently charged.

Still yet another object of this invention is to provide an electrically powered vehicle with a rapidly charging battery or capacitor which is secondary to a larger battery.

It is a further object of this invention is to open the electrical circuit between the battery and capacitor during the charging process to minimize damage in the event of a lightning strike or power surge.

The foregoing has outlined rather broadly the more pertinent and important features of the present invention in order that the detailed description of the invention that follows may be better understood so that the present contribution to the art can be more fully appreciated.

Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a method and apparatus for charging electrically powered devices. In accordance with the invention, the device is powered by two storage or charge receiving devices. One of these devices is capable of receiving a substantial charge very rapidly while the other device requires a longer time to receive a charge. The advantage is that the powered device can be used almost instantly and continually while at the same time rebuilding electrical charge. The present invention further relates to a system for protecting the charging device from being damaged from an electrical surge, such as from a lightning strike.

Electric Vehicles and Charging Stations

Figure 1:
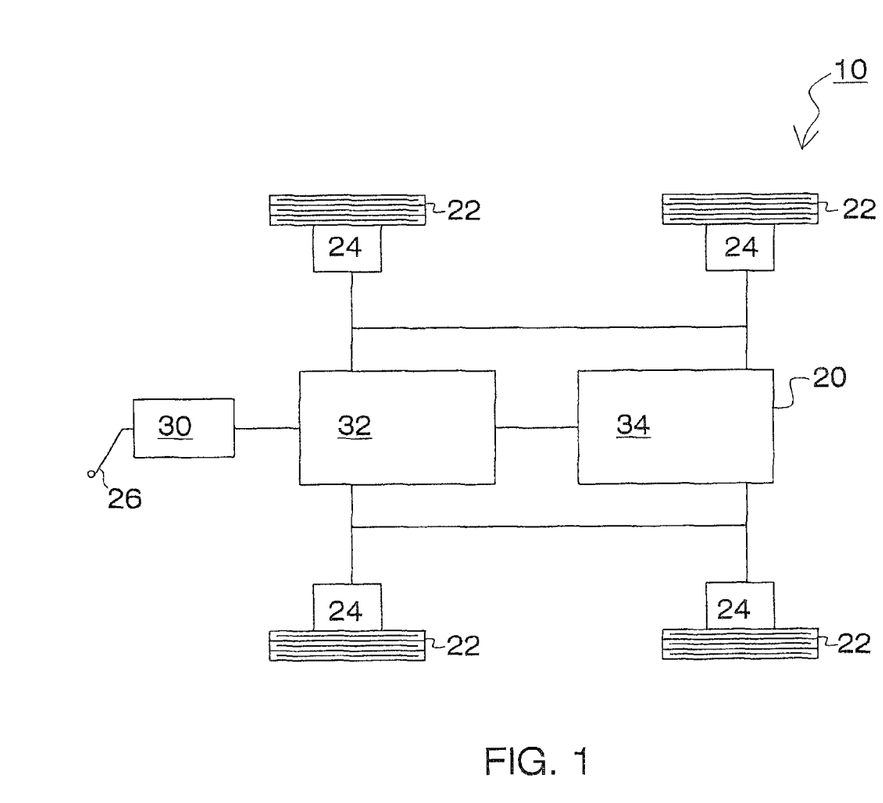
FIG. 1 is a schematic representation of a vehicle constructed in accordance with the subject invention.

FIG. 1 is a schematic diagram illustrating the various components of the primary embodiment 10 of the present invention. As illustrated, the invention relates to a vehicle 20 that includes four independently operating wheels 22. In the preferred embodiment, these wheels are each powered by independent electrical motors 24. An electrical power supply, described below, routes current to each of the motors to permit the independent rotation of each wheel 22. In the alternative, one single electric motor can be used to power all four wheels.

Figure 2:
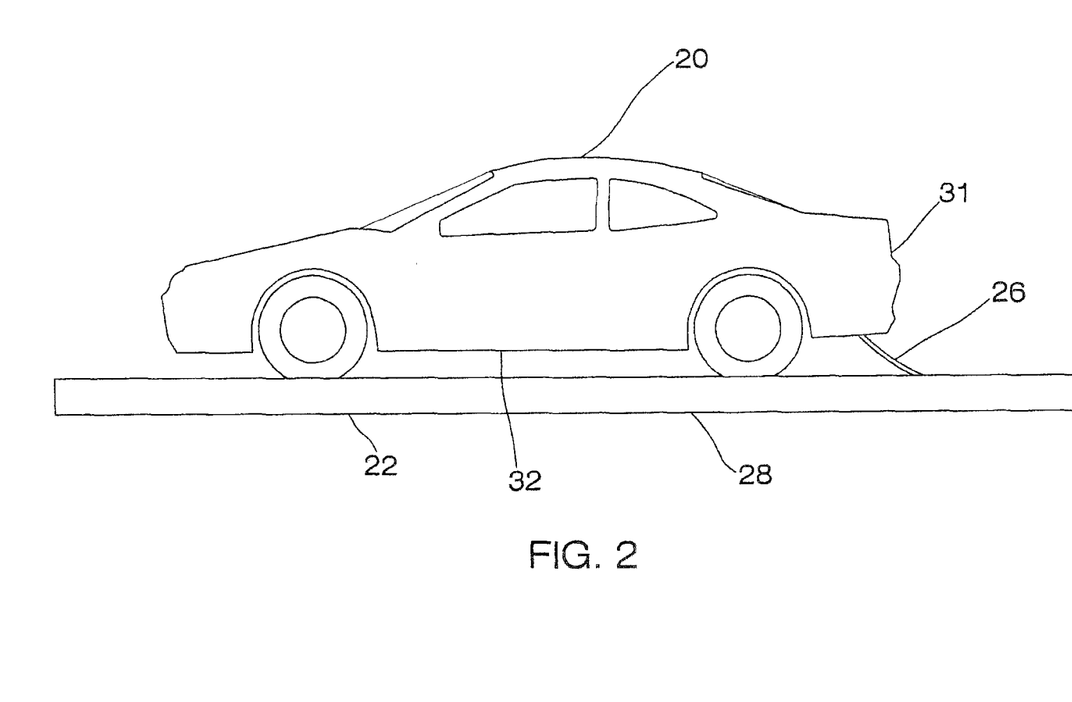
FIG. 2 is a side elevational view of a vehicle and associated roadway surface constructed in accordance with the present invention.

With continuing reference to FIG. 1, it will be seen that the vehicle 20 further includes a contact pole 26 that extends downwardly from the rear of vehicle 20. Although this is the preferred location for contact pole 26, those of ordinary skill in the art will appreciate that pole 26 can be positioned at other locations around vehicle 20. A retraction assembly 30 is also provided for raising or lowering pole 26. Assembly 30 is such that it can selectively move contact pole 26 between a first stored orientation and a second deployed orientation. In the stored orientation, pole 26 is preferably located within the body of vehicle 20. FIG. 2 illustrates contact pole 26 in its second deployed orientation. In this orientation, pole 26 preferably extends down far enough to make contact with roadway 28.

The batteries of the vehicle are described next in conjunction with FIG. 1. The vehicle is ideally supplied with one device for rapidly receiving charge 32 and one or more longer charge storage batteries 34. Devices that can be rapidly charged generally suffer from the fact that they also quickly dissipate charge and, therefore, are not ideal for prolonged electrical storage. Conversely, slower charging batteries are generally capable of storing electrical charge for prolonged periods of time but also take longer to accumulate a sufficient charge.

In one preferred embodiment, device 32 is a bank of high capacity high voltage capacitors that are capable of being fully charged in as little as 30 seconds. Those of ordinary skill in the relevant art will appreciate suitable high voltage capacitors that will suffice for this purpose. Furthermore, device 34 is any suitable storage battery. One acceptable storage battery is an advanced ultrathin organic radical polymer battery ("ORB"). Other organic polymer batteries will also suffice for this purpose. For example, U.S. Pat. No. 4,869,979 to Ohtani et. al. discloses the general construction for a organic polymer batter that may be employed in conjunction with the present invention.

Figure 3:
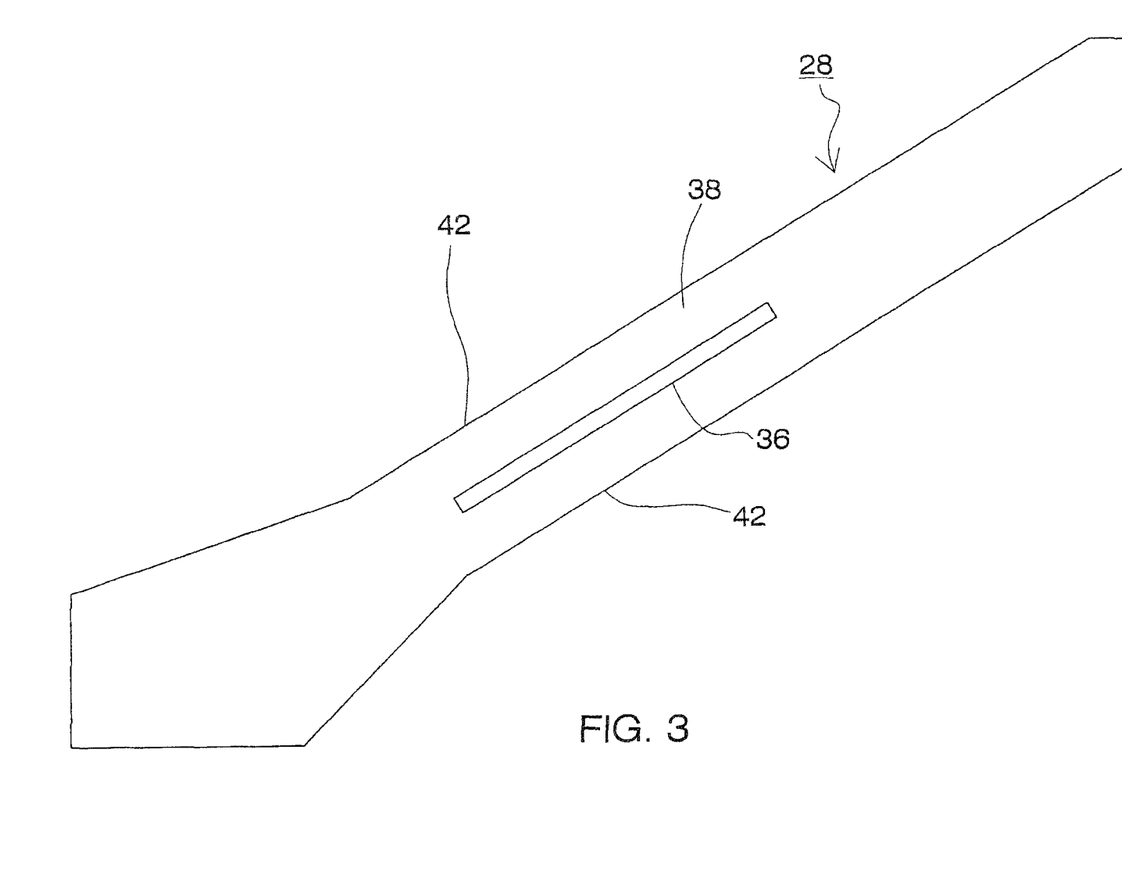
FIG. 3 is a perspective view of a roadway constructed in accordance with the present invention.

The roadway 28 forms another component of this inventive system. As illustrated in FIGS. 2 and 3, the roadway 28 includes a series of discrete and embedded electrical conductors 36 which are each positioned within corresponding slots 38. The conductors 36 are discrete in that the present invention obviates the need for a continuous electrical conductor of a substantial length. Rather, the system 10 of the present invention can be carried out with electrical strips 36 of a foot or so in length. The distance between successive conductive strips 36 is indicated by reference "D" in FIG. 4. This distance can be several feet or yards in length.

Figure 4:
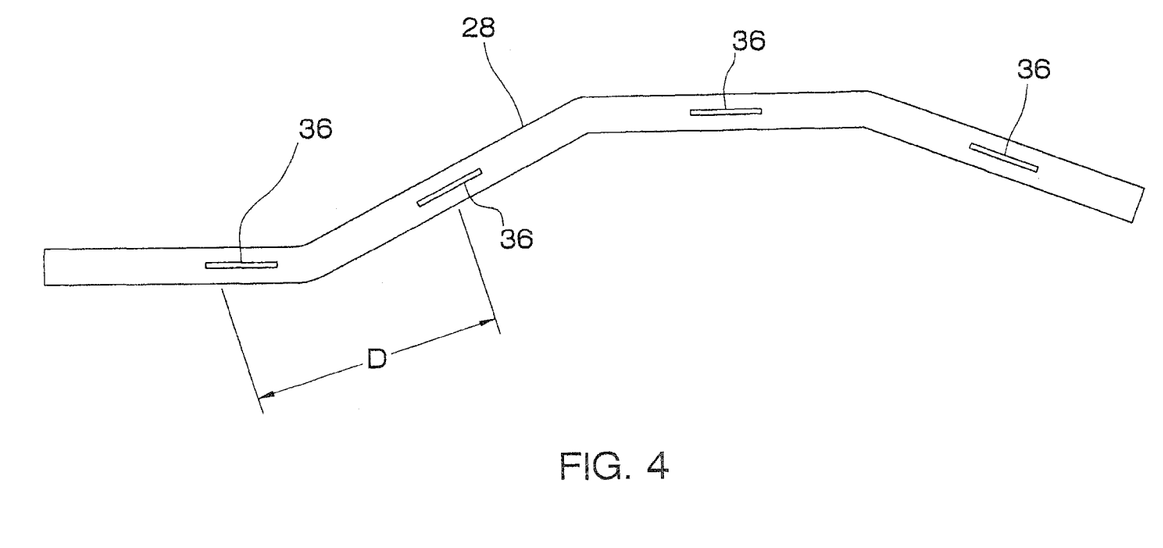
FIG. 4 is a perspective view of a roadway constructed in accordance with the present invention.

A series of several strips would constitute a single charging station. FIG. 4 is a depiction of a single charging station. The distance between successive stations could be several miles. The capacity of the storage battery chosen will depend, in part, on the average distance between these charging stations.

The individuals conductors 36 that make up a charging station can be interconnected via a common ground wire for the purpose of delivering a suitable electric charge. Alternatively, each strip 36 can be interconnected to its own power source.

In use, and as shown in FIG. 2, as vehicle 20 is traveling down the road, contact pole 26 can be placed into the extended orientation by the driver. In this orientation, when the driver drives over conductors 36, contact pole 26 will dip down into slot 38. Contact pole 26 preferably includes a slight curve to bring it in contact with conductor 36. Both the high voltage capacitors 32 and the storage batteries 34 can be charged during this contact. When the vehicle leaves the charging station the driver can retract the contact pole 26. During the charging process, capacitors 32 charge first. Thus, being at the higher voltage, the capacitors 32 then transfer most of their electric charge to the storage batteries 34. This transfer can occur with pole 26 in either its extended or retracted orientation. After traveling a few thousand feet or a few miles the vehicle 20 can again travel over into a charging lane as shown in FIG. 3. The design of the lane directs the vehicle into position for the contact pole 26 to again drop down into the charging trench 38. Raised lane guides 42 may be included for guiding a vehicle 20 into the charging area.

The process of charging capacitors 32, and then having the capacitors 32 charge the storage batteries 34, continues until the batteries 34 are full. As vehicle 20 moves along it will use electricity which will deplete storage batteries 34. When batteries 34 are sufficiently depleted, vehicle 20 can again enter a charging station. Here, vehicle 20 will again get re-supplied as pole 26 contact conductors 36 in the roadway 28. This contact will charge capacitors 32, which in turn, will charge the storage batteries 34.

Capacitors 32 could also be charged by another capacitors in the roadway. The onboard capacitors 32 could also be used to accelerate the vehicle 20 from stop or to a higher velocity faster than could the storage batteries 34. The vehicle 20 can operate at higher speeds thereby depleting the battery faster by knowing the battery is being recharged repeatedly without stopping. This method could also be used to reduce the number of batteries thereby reducing the cost and weight of vehicles.

Thus, the present invention is directed to a method of repeatedly recharging an electric powered vehicle without stopping by receiving a very rapid supply of electric energy from a vehicle contact with the road that thereby rapidly charges an onboard set of capacitors (or other such device such as a fuel cell) While the vehicle continues in motion, the capacitors (or other such device such as a fuel cell) charge the batteries and could also, if desired, provide electric direct to the motors until all its energy is released. Soon the vehicle is receiving another electric charge, the capacitors are filled and the batteries are charged again.

This process continues as an ongoing process. When a vehicle such as this stops then the contact pole will make contact with an electric supply provided and both the capacitor and battery are charged simultaneously while parked.

The present invention also relates to an electrified roadway that is electrified to provide electric to vehicles upon contact only on an intermittent basis. Instead of providing continuous electrified rails, overhead cables, or wires in a road bed running for miles, the electric roadway may have electric contact power supply rails, or wires ranging from a few inches or less on up to several hundred feet but with non-electrified roadbed running for thousands of feet or several miles between these electric contact power supply in the road as noted in FIG. 4. It is understood the contact and transmission of electric between roadway and vehicle could be accomplished in numerous ways.

It is understood, and it is also a claim of this invention, that an electric powered vehicle could be provided with no capacitors but have rapidly charging batteries. Presently some batteries can be fully charged in 30 seconds. This means a vehicle would be charged while in motion and the roadbed could be intermittently electrified, but the vehicle would need to remain in contact with the roadbed for a much longer time.

Surge and Lightening Protection

An additional aspect of the invention relates to protecting the vehicle and the charging station from the adverse effects of a lightning strike and/or power surge. The surge protection system is disclosed in connection with the electric vehicle 52 depicted in FIG. 5. As in the primary embodiment, vehicle 52 is driven by separate electric motors 82 built into each wheel. In normal operation, the electric motors 82 receive electric power from a set of rapid charge batteries 56 (such as ultrathin organic radical polymer).

Figure 5:
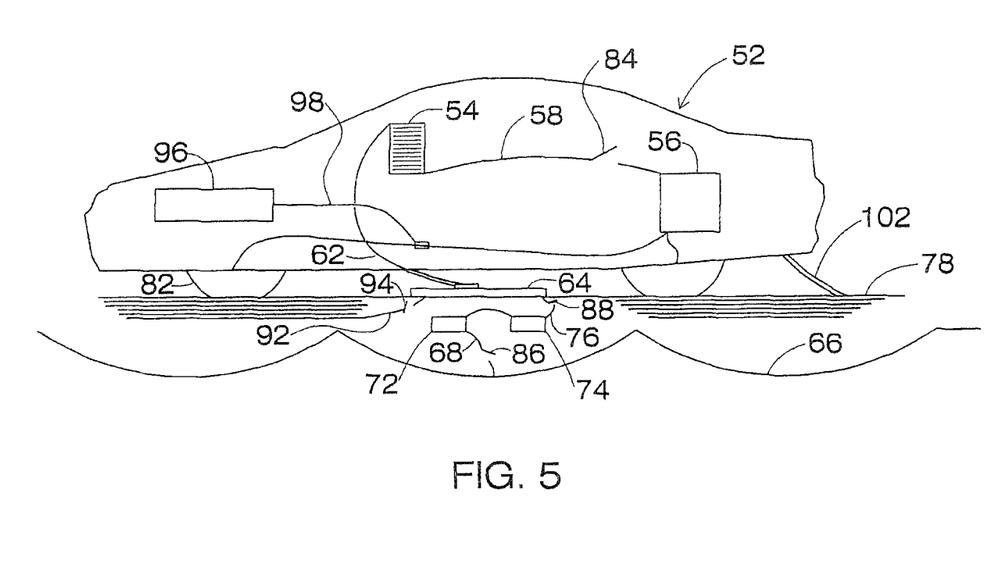
FIG. 5 is a sectional view of an alternative embodiment of the system of the present invention.

Batteries 56, in turn, are intermittently charged by high capacity, high voltage capacitors 54 (or circuits which accomplish the same result) that are also on board vehicle 52. The vehicle receives its electricity from an electrified intermittent rail segment 64 that may also be referred to as a "charging station" or simply as the "rail segment." Rail segment 64 itself is not charged when there is no vehicle passing over it. If rail segment 64 was continuously charged regardless of the presence of a vehicle, it would present a strong attraction for lightning. It would also be a safety hazard to anyone who happened to come in contact with it.

In order to facilitate the intermittent charging of rail segment 64, a closed grounding circuit 92 and switch 94 regulate the current flow to rail 64. Rail segment 64 further includes a high voltage feed capacitors 74 and an up-charge transformer 72 built into the roadway. These devices are also regulated to stop the current flow when rail 64 is inactive. The feed capacitor 74 and the up-charge transformer 72 together provide the high voltage charge from the high voltage transmission/distribution lines 66 that bring power directly from a generating station. Turning these devices off during periods of inactivity saves energy and prevent overheating.

In use, a signal is sent to rail segment 64 when the vehicle 52 gets within a specified distance. This can be achieved via an RFID signal, radio signals, or a GPS receiver. Once the signal is received, a switch 86 closes a circuit 68 to put transmission/distribution lines 66 into electrical communication with the up-charge transformer 72. This allows the roadway feed capacitors 74 to begin charging. Vehicle 52 then subsequently passes over the rail segment 64. Thereafter, when the entire rail segment 64 is under vehicle 52 several circuits are triggered. This can be achieved via an RFID sensor or contact switch. Once activated, switch 94 opens up a ground circuit 92. Additionally, switch 88 closes circuit 76. Circuit 76, in turn, connects roadway feed capacitors 72 to rail segment 64.

Next, as the vehicle mounted contact brush 62 approaches rail segment 64, switch 84 opens the energy transfer circuit 58 that connects the vehicle mounted capacitors 54 to the onboard vehicle batteries 56 and motors 82. As all of this happens vehicle batteries 56, electric motors 82 (and associated control circuits) are protected from lightning strikes and power surges. Moreover, rail segment 64 is isolated from the ground so it can receive and hold a charge. Rail segment 64 also becomes completely protected from lightning because it is completely covered by vehicle 52. Thus, in the event vehicle 52 was hit, it relies upon the "faraday cage" effect to harmlessly divert the lightning to the ground.

As the vehicle continues forward the vehicle mounted contact brush 62 loses contact with the rail segment 64. As a result, switch 84 closes to permit circuit 58 to download high voltage through appropriate circuits that step voltage down from the capacitors 54 to the batteries 56. Additionally, switch 86 of circuit 72 opens to cease electrical communication between transmission/distribution lines 66 and transformer 72. Switch 88 also opens on circuit 76 so the capacitors 72 are prevented from sending more charge to rail segment 64. Finally, switch 94 closes on ground circuit 92 so the rail segment 64 can dissipate any residual charge.

When the vehicle is parked batteries 56 and capacitors 54 can be charged. When vehicle 52 is moving from 0 mph to 120 mph there is a need for strong acceleration. To accomplish this, rail segment 64 could be temporarily replaced with a longer more traditional electrified rail and the batteries 56 and onboard capacitors 54 could be bypassed to feed power directly from the rail to the electric motors. When vehicle 52 is faced with a steep uphill grade rail segments 64 can be placed much closer together and the capacitors 54 can bypass batteries 56 to thereby feed a stronger electric supply to the electric motors 82 so vehicle 52 can climb a much steeper grade than it could otherwise do with just the direct battery power.

In the event there is an electric power failure, a blackout, the generating station loses power, there is a short circuit in a system, there is a failure of the energy storing devices on board an individual vehicle, there needs to be a backup power supply on board each vehicle to prevent system disruption or shutdown.

FIG. 5 shows vehicle 52 equipped with high capacity capacitors 54, and a rapid charge battery 56 and all the related equipment, but it also has fuel cells a hybrid internal gasoline, diesel or bio fuel powered combustion engine 96 that drives a generator that supplies sufficient power through circuit 98 to the electric motors 82. This allows individual vehicles and system as a whole to continue to operate during a power failure or emergency of any sort such as a storm, it has the additional benefit that vehicle 52 can operate for extended distances when vehicle 52 is not on the electrified roadway. This increases the flexibility and usefulness of the vehicle.

Pulse Charging

Figure 6:
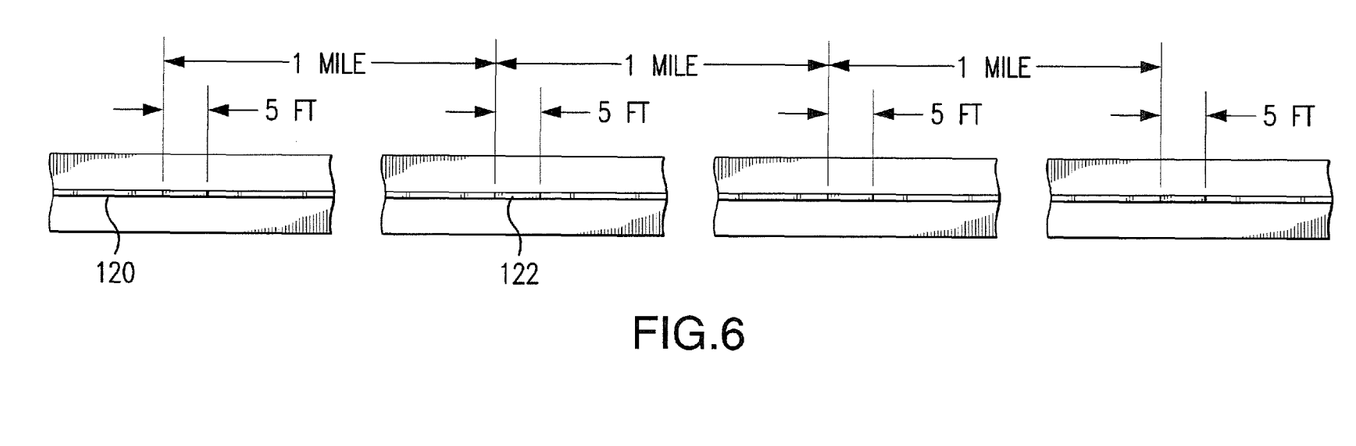
FIG. 6 is a plan view of a roadway employed in an alternate embodiment of the present invention.
Figure 7:
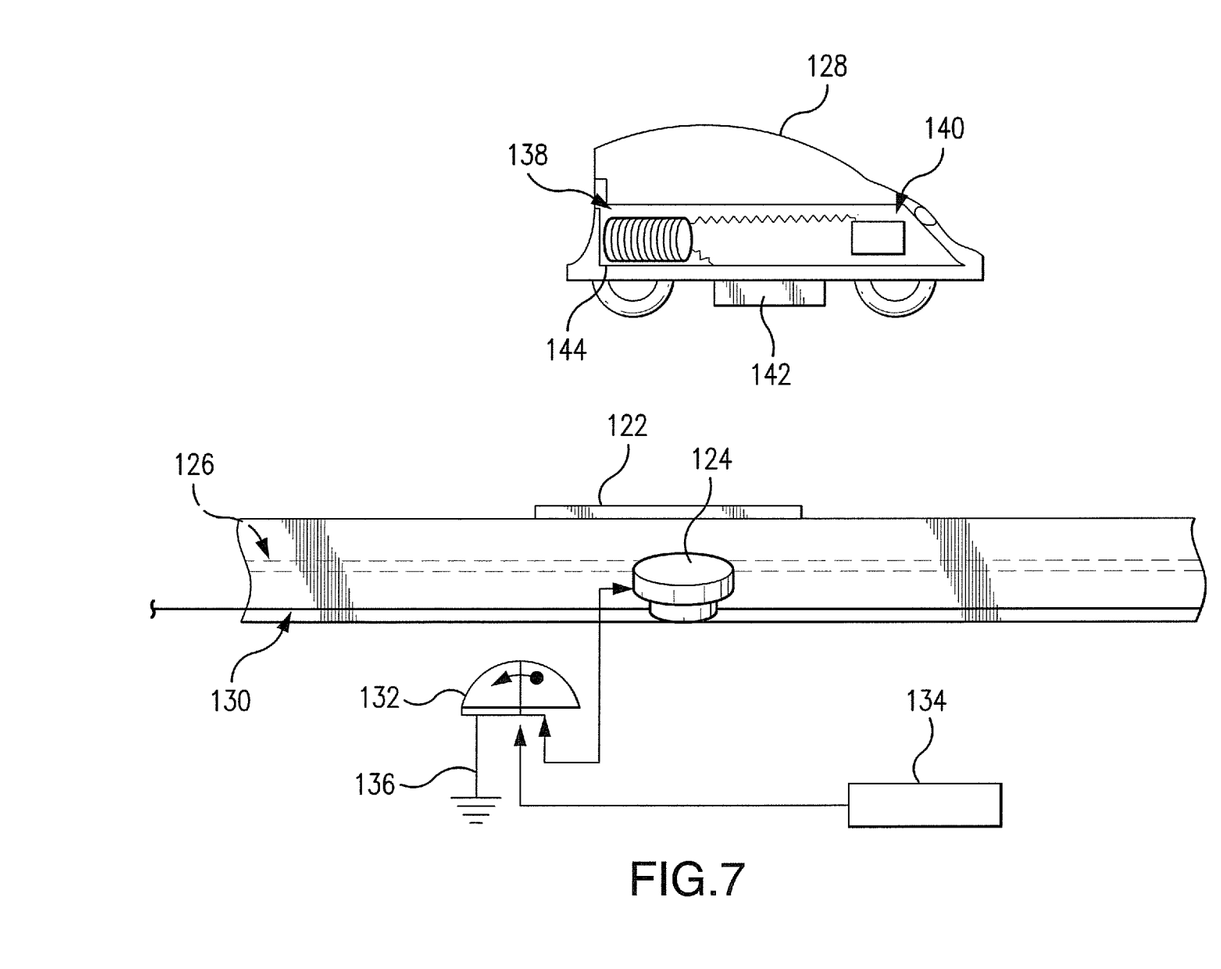
FIG. 7 is a perspective view of an alternative embodiment of the present invention.
Figure 8:
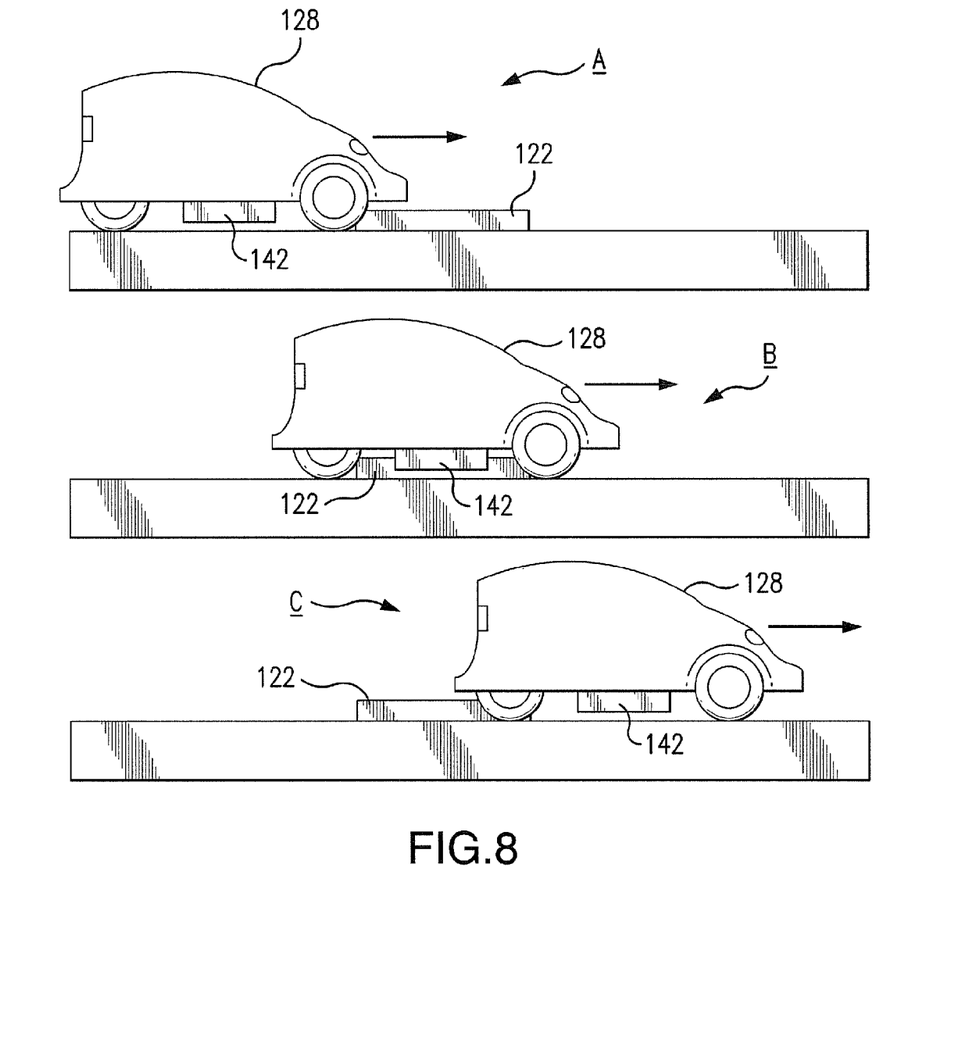
FIG. 8 is a elevational view of an alternative embodiment of the present invention.

An additional aspect of the invention relates to the rapid charging of vehicles via the pulse charging system disclosed in FIGS. 6-8. In this embodiment the roadway is a flat narrow surface with a raised beam 120 down the center (note FIG. 6). At one mile intervals there are charging strips 122 typically five feet long. Somewhere in the vicinity of the charging strip is a charging device 124. In the preferred embodiment, charging device 124 is a superconducting electromagnetic energy storage device (SMES) (note FIG. 7). A miniaturized SMES can also be employed. It is also within the scope of the invention to utilize a compressor to cool the SMES and to also push coolant through the associated transmission line. It should be appreciated that an SMES is not the only device capable of delivering this energy. Other charging devices can alternatively be used, such solid state devices, electromagnetic devices, and vacuum tubes.

SMES 124 is electrically connected to a central power source via an associated high voltage transmission line 126 formed within the roadway. SMES 124 is also electrically connected to an associated charging strip 122. In this regard, each strip 122 may have an associated SMES. Line 126 can be a supercooled superconductor transmission line operating at 300 kv. The SMES receives the electricity from transmission line 126 (or via a standard electrical conductor) and accumulates the energy into an electromagnetic field. SMES 124 may step up the power delivered by line 126 to 700 kv. SMES 124 thereafter builds up the necessary electromagnetic field. A 100 kv electric distribution back feed 130 can also be included.

The system also includes a switch 132, a controller 134, and a grounding wire 136. At a first position, switch 132 closes the ground circuit and opens the charging circuit. In this position, voltage from SMES 124 is delivered to charging strip 122. At a second position, switch 132 closes the charging circuit and opens the ground circuit. In this position, voltage is not delivered to strip 122, rather the circuit is connected to ground via wire 136. A sensor can be employed, as described above, to open the charging circuit when vehicle 128 is over a charging segment 122 and to open the grounding circuit in all other circumstances.

FIG. 8 illustrates a vehicle 128 approaching a charging strip 122. At position A, the vehicle 128 is not yet over strip 122 and charging has not yet commenced. As such, charging circuit remains closed. Thereafter, when vehicle 128 reaches position B, charging circuit is opened and energy is released very rapidly from SMES 124 and into the associated charging strip 122. This is a pulse type charge. The vehicle 128 utilizes a super capacitor 138 (note FIG. 7) that receives energy from the charging strip 122 via saddle 142. Super capacitor 138 is preferably a series of pulse charged super capacitors. Super capacitor 138 can be an electric double layer capacitor or an electrochemical double layer capacitor. Such capacitors have a very high energy density, often two to three orders of magnitude greater than conventional capacitors. Super capacitor 138 is preferably in electrical contact with a series of high energy density ultra capacitors 140. Ultra capacitors are currently sold by Maxwell Technologies of San Diego, Calif. Capacitors 140 correspond storage batteries 34 in the foregoing embodiment. Likewise, capacitors 138 correspond to rapid charge batteries 32.

When at position B, charging strip 122 supplies charge to a security saddle 142 mounted to the underside of vehicle 128. Co-owned Application Ser. No. 61/221,701 entitled "Sensory Stabilizer Saddle" discloses possible saddle configurations. In one embodiment, saddle 142 is a c-shaped electrical conductor that mates with the raised charging strip 122 in order to facilitate charging. Energy can be transferred from strip 122 to saddle 142 via direct contact or friction, by coronal discharge, by induction, by microwave, by laser, or by any physical or wireless transmission of electricity. Finally, at position C, vehicle 128 has left the charging station and circuit associated with segment 122 is closed.

The following is a specific example of the disclosed pulse charging system. Vehicle 128 is travelling 120 miles per hour along the roadway. An electric vehicle typically requires 0.25 KWH of electricity per mile. Vehicle 128 also needs electric power to operate heating/A/C, computers, controls, electronic devices of the passenger. Additionally, some charge is needed for transfer to and storage within ultra capacitors 140 to keep them fully charged. The power in the super capacitors 138 is used to operate the in-wheel electric motors 144 (FIG. 7).

It is estimated 0.5 KWH of electric must be transferred at 1 mile intervals to provide all these energy needs. With a vehicle travelling 120 MPH with five (5) foot long charging strips 122 the 0.5 KWH of electricity must be transferred in approximately 50 milliseconds. The super capacitors 138 only need to hold 0.5 KWH of energy. In order to transfer 0.5 KWH of energy SMES 124 will need to supply approximately a 36 megawatt burst of power for 50 milliseconds. This can be 1200 kilowatts with 30 Amps of current or any variation. The pulse does not have to be a flat supply. The pulse could be building up to a peak in excess of 36 megawatts but delivering in aggregate the amount of energy needed. The result is that pulse charged vehicle 128 is operated directly from the pulsed charge for one mile intervals. Ultra capacitors 140 are used as back up energy sources on the guideway and as primary energy supply when vehicle 128 is operating off of the guideway.

It is understood that the charging strip 122 could be of any length, there could even be a series of charging strips each charged in rapid succession from the same pulse charging device 124. Vehicle 128 could be operating at any speed. If vehicle 128 is travelling slower than the time available for charge transfer is longer. The distance between charging strips 122 does not have to be a mile. This distance could be greater or less. All these parameters are adjusted based on operating capacities, operating capabilities, and equipment costs at various operating levels.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A system for rapidly charging electric vehicles comprising in combination:
   a vehicle having four wheels, an individual electric motor associated with each of the four wheels, whereby each wheel is independently powered by the associated electric motor;
   a series of pulse charged super capacitors stored within the vehicle and adapted to be rapidly charged and un-charged, a series of ultra capacitors within the vehicle and adapted to be slowly charged and un-charged, the pulse charged super capacitors and the ultra capacitors being in electrical communication;
   a roadway including a series of raised charging segments, each charging segment being powered by an associated superconducting electromagnetic energy storage device (SMES);
   a circuit associated with each charging segment, each circuit having an opened position wherein the charging segment receives charge from the associated SMES and a closed position wherein the circuit is grounded;
   a saddle extending downwardly from the vehicle, the saddle being in electrical communication with the pulse charged capacitors, the saddle adapted to be positioned about and in direct contact with the raised charging segments within the roadway while the vehicle is in motion;
   a sensor for placing the circuit into the opened position when the saddle is in direct contact with a charging segment, whereby the pulse charged capacitors are charged via the charging segment and the associated SMES.

2. A system for rapidly charging electric vehicles comprising in combination:
   a vehicle powered by an electric motor;

a series of pulse charged super capacitors stored within the vehicle and adapted to be rapidly charged and un-charged;

a roadway including a series of raised charging segments, each charging segment being powered by an associated superconducting storage device and an associated circuit, the circuit having a first position wherein a charge is delivered to the charging segment via the associated superconducting storage device;

a saddle extending downwardly from the vehicle, the saddle being in electrical communication with the pulse charged capacitors, the saddle adapted to directly contact the raised charging segments within the roadway while the vehicle is in motion;

a sensor for placing the circuit into the first position and charging the pulse charged capacitors only when the saddle is in direct contact with a charging segment.

3. The system as described in claim 2 wherein the superconducting storage device is a superconducting electromagnetic energy storage device (SMES).

4. The system as described in claim 2 wherein the vehicle is a four wheeled vehicle and an electric motor is associated with each of the four wheels.

5. The system as described in claim 2 wherein the vehicle further includes a series of ultra capacitors within the vehicle that are in electrical communication with the pulse charged super capacitors and wherein the ultra capacitors are adapted to be slowly charged and un-charged.

6. A system for rapidly charging electric vehicles comprising in combination:

a vehicle powered by an electric motor;

a series of super capacitors stored within the vehicle and adapted to be rapidly charged and un-charged;

a roadway including a series of raised charging segments, each charging segment being powered by a separate superconducting power source;

an electrically conductive saddle associated with the vehicle, the saddle being in electrical communication with the series of capacitors, the saddle adapted to directly contact the charging segments within the roadway while the vehicle is in motion to thereby power the capacitors and vehicle;

a sensor for selectively powering the charging segments only when the saddle is in direct contact with a charging segment.

\* \* \* \* \*

UNITED STATES PATENT AND TRADEMARK OFFICE
CERTIFICATE OF CORRECTION

PATENT NO. : 8,493,024 B2
APPLICATION NO. : 12/776911
DATED : July 23, 2013
INVENTOR(S) : Waldemar F. Kissel, Jr.

It is certified that error appears in the above-identified patent and that said Letters Patent is hereby corrected as shown below:

In the Specification

Col. 4, line 1, the term "battery chosen" should be "battery 34 chosen".

Signed and Sealed this
Twenty-fourth Day of September, 2013

Teresa Stanek Rea
*Deputy Director of the United States Patent and Trademark Office*